United States Patent Office 3,726,766
Patented Apr. 10, 1973

3,726,766
PROCESS FOR PRODUCING LINCOMYCIN
Alexander D. Argoudelis, Portage, and John H. Coats, Kalamazoo, Mich., assignors to The Upjohn Company, Kalamazoo, Mich.
No Drawing. Filed June 28, 1971, Ser. No. 157,729
Int. Cl. C12d 9/20
U.S. Cl. 195—80 R          3 Claims

ABSTRACT OF THE DISCLOSURE

A novel microbiological process for preparing the antibiotic lincomycin.

BRIEF SUMMARY OF THE INVENTION

Lincomycin is an antibiotic producible by a fermentation process using the microorganism *Streptomyces lincolnensis* var. *lincolnensis*. In U.S. Pat. 3,086,912 there is described a fermentation and recovery process for the production of lincomycin, formerly known as lincolnensin. The microbiological process of the subject invention comprises the use of a novel microorganism to produce lincomycin.

DETAILED DESCRIPTION OF THE INVENTION

The novel actinomycete used according to this invention for the production of lincomycin is *Streptomyces pseudogriseolus* chemovar *linmyceticus* Dietz var. nova. One of its strain characteristics is the production of lincomycin. A subculture of this living organism can be obtained upon request from the permanent collection of the Northern Utilization and Research Division, Agricultural Research Services, U.S. Department of Agriculture, Peoria, Ill., U.S.A. Its accession number of this repository is NRRL 3985.

DESCRIPTION OF THE MICROORGANISM

*Streptomyces pseudogriseolus* chemovar *linmyceticus*
Dietz var. nova

Color characteristics.—Aerial growth predominantly gray. On a few media aerial growth may be red, white, or gray-white. Melanin-negative. Appearance on Ektachrome, as described in Dietz [Dietz, A. 1954. Ektachrome transparencies as aids in actinomycete classification. Ann. N.Y. Acad. Sci. 60:152–154; Dietz, A., and J. Mathews, 1962. Taxonomy by carbon replication. I. An examination of *Streptomyces hygroscopicus*. Appl. Microbiol. 10:258–263; Dietz, A. 1967. *Streptomyces steffisburgents* sp. n. J. Bacteriol. 94:2022–2026] is given in Table I. Reference color characteristics are given in Table II. The culture may be placed in the Gray (GY), White (W), and Red (R) color series of Tresner and Backus [Tresner, H. D., and E. J. Backus. 1962. System of color wheels for streptomycete taxonomy. Appl. Microbiol. 11:335–338].

Microspic characteristics.—Sporophores short to moderate in length, appearing as straight (RF) to open spiral (RA) to spiral (S) in the sense of Pridham, et al. [Pridham, T. G. and D. Gottlieb. 1948. The utilization of carbon compounds by some Actinomycetales as an acid for species determination. J. Bacteriol. 56:107–114]. Spores, examined by the Transmission Electron Microscope (TEM) procedures of Dietz and Mathews [Dietz, A. and J. Mathews. 1962. Taxonomy by carbon replication. I. An examination of *Streptomyces hygroscopicus*. Appl. Microbiol. 10:258–263; Dietz A. and J. Mathews. 1970. Classification of Streptomyces spore surfaces into five groups. Appl. Microbiol. 21:527–533], are oval to oblong with short spines on the surface. Spines are sparse.

Cultural characteristics.—See Table III.

Carbon utilization.—Growth of the culture on carbon compounds was determined using the synthetic medium of Pridham Gottlieb [Pridham, T. G. and D. Gottlieb. 1948. The utilization of carbon compounds by some Actinomycetales as an aid for species determination. J. Bacteriol. 56:107–114], Table IV, and their modified medium [Shirling, E. B. and D. Gottlieb. 1966. Methods for characterization of Streptomyces species. Int. J. Syst. Bacteriol. 16:313–340], Table V.

Temperature.—The culture grew at temperatures of 18° C. to 55° C. on Bennett's, Czapek's sucrose, and maltose-tryptone agars. Growth at 18° C. and 55° C. was predominantly vegetative. There was slight aerial growth at 24° C. Good aerial and vegetative growth occurred at 28° C. to 45° C.

Antibiotic-producing properties.—*Streptomyces pseudogriseolus* ATCC 12770, produces the antibiotic anti-toxoplasmic substance No. 534 (xanthomycin) [Okami, Yoshiro, R. Utahara, H. Oyagi, S. Nakamura, and H. Umezawa. 1955. The screening of anti-toxoplasmic substance produced by streptomycete and anti-toxoplasmic substance No. 534. The journal of Antibiotics, Ser. A 8:126–128]. *Streptomyces pseudogriseolus* chemovar linmyceticus produces the antibiotic lincomycin.

*Streptomyces pseudogriseolus* chemovar *linmyceticus* is a new soil isolate of the genus Streptomyces.

A distinctive property of the culture is the production of the antibiotic lincomycin. This culture is readily distinguished from the lincomycin-producing cultures *Streptomyces lincolnensis* var. lincolnensis [Mason, D. J., A. Dietz, and C. De Boer, 1962. Lincomycin, a new antibiotic. I. Discovery and Biological Properties. Antimicrobial Agents and Chemotherapy—1962, pp. 554–559] and *Streptomyces espinosus* (application Ser. No. 102,-141, filed Dec. 28, 1970) by color pattern, sporophore, and spore type. *S. lincolnensis* has pale pink aerial growth, is melanin-positive and has rectangular smooth spores borne in long straight to flexuous sporophores. *S. espinosus* has gray-green aerial growth, is melanin-negative and has round spiny spores borne in short straight to open-spiral sporophores. *S. pseudogriseolus* chemovar linmyceticus has gray aerial growth, is melanin-negative, and has oval to oblong sparsely spiny spores borne in short to moderately long straight to open spiral to spiral sporophores.

The new lincomycin-producing culture is very similar to the type culture *Streptomyces pseudogriseolus* Okami and Umezawa, ATCC 12770. The cultures differ slightly in color pattern, utilization of some carbon compounds, and in antibiotic-production. The significant differentiating characteristics of the new soil isolate, from the type culture *S. pseudogriseolus*, is the production of the chemical entity the antibiotic lincomycin. According to Rule 8, Recommendation 8a of the International Code of Nomenclature of Bacteria [International Code of Nomenclature of Bacteria, 1966. Edited by the editorial board of the Judicial Commission of the International Committee on Nomenclature of Bacteria. Intern. J. System. Bacteriol. 16:459–490], the term "chemovar" may be used to designate a strain producing some chemical not normally produced by the type strain of the species.

The characteristics of *Streptomyces pseudogriseolus* chemovar linmyceticus Dietz var. nova., NRRL 3985, are given in the following tables:

Table I.—Appearance of *S. pseudogriseolus* cultures on Ektachrome.

Table II.—Reference color characteristics of *S. pseudogriseolus* cultures.

Table III.—General cultural characteristics of *S. pseudogriseolus* cultures.

Table IV.—Utilization of carbon compounds in the synthetic medium of Pridham and Gottlieb.

Table V.—Utilization of carbon compounds in the modified medium of Pridham and Gottlieb.

TABLE I

Appearance of *S. pseudogriseolus* cultures on Ektachrome [1]

| Agar medium | *S. pseudogriseolus* chemovar linmyceticus | *S. pseudogriseolus* ATCC 12770 |
|---|---|---|
| Bennett's: | | |
| S | Gray | Gray. |
| R | Pale red-tan | Tan (with red tinge). |
| Czapek's sucrose: | | |
| S | Gray | Gray. |
| R | Red-gray | Gray (with red-tinge). |
| Maltose-tryptone: | | |
| S | Gray | Gray. |
| R | Deep red-brown | Light red-brown. |
| Peptone-iron: | | |
| S | No aerial growth | No aerial growth. |
| R | Yellow-tan | Yellow-tan. |
| 0.1% tyrosine: | | |
| S | Trace gray | Trace gray. |
| R | Red | Red. |
| Case in starch: | | |
| S | Gray | Gray. |
| R | Very pale red-gray | Red-gray. |

[1] Dietz, A., "Ektachrome Transparencies as Aids in Actinomycete Classification", Annals of the New York Academy of Sciences, 60:152–154, 1954.

Note.—S = Surface; R = Reverse.

TABLE II

Reference color characteristics of *S. pseudogriseolus* cultures

| | Color Harmony Manual, 3rd ed. 1948 [1] | | NBS Circular 553 [2] | |
|---|---|---|---|---|
| Agar medium | *S. pseudogriseolus* chemovar linmyceticus | *S. pseudogriseolus* ATCC 12770 | *S. pseudogriseolus* chemovar linmyceticus | *S. pseudogriseolus* ATCC 12770 |
| Bennett's: | | | | |
| S | e gray | 5 fe ashes | 94 m light olive brown; 109 gm light grayish olive. | 63 m light brownish gray. |
| R | 2 ge covert tan, griege | 3 ig beige brown, mist brown. | | 80 m grayish yellowish brown; 95 g moderate olive brown. |
| P | | | | |
| Czapek's sucrose: | | | | |
| S | e gray | 3 fe silver gray | | 63 gm light brownish gray. |
| R | e gray | 3 fe silver gray | | Do. |
| S | | | | |
| Maltose-tryptone: | | | | |
| S | e gray | c light gray | | 264 gm light gray. |
| R | 3 ig beige brown, mist brown. | 2 ie light mustard tan | 80 m grayish yellowish brown; 95 g moderate olive brown. | 91 gm dark grayish yellow; 94 g light olive brown; 106 g light olive. |
| P | 2 li | | 100 gm grayish olive | |
| Yeast extract-malt extract (ISP-2): | | | | |
| S | e gray | 5 fe ashes | | 63 m light brownish gray. |
| R | 3 li beaver | 4 li beaver | 80 m grayish yellowish brown; 95 g moderate olive brown. | 61 m grayish brown; 81 g dark grayish yellowish brown. |
| P | | | | |
| Oatmeal (ISP-3): | | | | |
| S | 4 ge light fawn, rose beige | 3 fe silver gray | 29 m moderate yellowish pink; 57 g light brown. | 63 gm light brownish gray. |
| R | 4 ge light fawn, rose beige | 3 ge beige, camel | 29 moderate yellowish pink; 57 g light brown. | 76 gm light yellowish brown. |
| P | | | | |
| Inorganic-salts starch (SP-4): | | | | |
| S | C light gray | 3 fe silver gray | 264 gm light gray | 63 gm light brownish gray. |
| R | 3 ge beige, camel to 6 li dark rose taupe. | 5 ih lead gray, shadow gray. | 76 gm light yellowish brown to—. | 22 m reddish gray; 266 m dark gray. |
| P | 5 ig (around growth rose taupe. | 3 ge beige camel | 45 m light grayish reddish brown; 46 g grayish reddish brown; 61 g grayish brown. | 79 m light grayish yellowish brown; 94 m moderate orange yellow. |
| Glycerol asparagine (ISP-5): | | | | |
| S | 5 cb | 3 ml beaver gray to 3 fe silver gray. | | 96 g dark olive brown; 266 m dark gray—to 63 gm light brownish gray. |
| R | 3 ge light tan | 3 li beaver—to 1 de putty, griege. | 76 gm light yellowish brown. | 80 m grayish yellowish brown; 95 g moderate olive brown—to—; 121 m pale yellow green; 122 g grayish yellow green. |
| P | | | | |

[1] Jacobson, E., W. C. Granville, and C. E. Foss. 1948. Color harmony manual, 3rd ed. Container Corporation of America, Chicago.
[2] Kelly, K. L. and D. B. Judd. 1955. The ISCC-NBS method of designating colors and a dictionary of color names. U.S. Dept. of Comm. Circ. 553, Washington, D.C.

Note.—S = Surface; R = Reverse; P = Pigment.

TABLE III

General cultural characteristics of *S. pseudogriseolus* cultures

| | *S. pseudogriseolus* chemovar linmyceticus | *S. pseudogriseolus* ATCC 12770 |
|---|---|---|
| Agar media [1]: | | |
| Peptone-iron: | | |
|   S | Trace white aerial growth | Pale gray-white aerial growth. |
|   R | Yellow-cream | Yellow-tan. |
|   P | Yellow | Yellow. |
|   O | Melanin negative | Melanin negative. |
| Calcium malate: | | |
|   S | No aerial growth | Poor gray-tan aerial growth. |
|   R | Colorless | Gray-tan. |
|   P | None | None. |
|   O | Malate not solubilized | Malate not solubilized. |
| Glucose-asparagine: | | |
|   S | Trace gray aerial growth | Gray-white aerial growth. |
|   R | Pink-tan | Gray-yellow. |
|   P | Pale pink-tan | Pale pink-tan. |
| Skim milk: | | |
|   S | Trace gray-white aerial growth | Trace gray-white aerial growth. |
|   R | Yellow-orange | Yellow-orange. |
|   P | do | Do. |
|   O | Casein solubilized under growth | Casein solubilized under growth. |
| Tyrosine: | | |
|   S | Pale gray aerial growth | Heavy gray aerial growth. |
|   R | Red-tan | Maroon. |
|   P | do | Red-tan. |
|   O | Tyrosin solubilized | Tyrosine solubilized. |
| Xanthine: | | |
|   S | Pale gray aerial growth | Heavy gray aerial growth. |
|   R | Olive-cream | Olive-gray-cream. |
|   P | Pale cream | Pale olive. |
|   O | Xanthine solubilized | Xanthine solubilized. |
| Nutrient starch: | | |
|   S | Pale gray aerial growth | Heavy gray aerial growth. |
|   R | Pale red-tan | Olive-gray-cream. |
|   P | do | Pale olive. |
|   O | Starch hydrolyzed | Starch hydrolyzed. |
| Yeast extract-malt extract: | | |
|   S | Gray-white aerial growth | Heavy gray-white aerial growth. |
|   R | Maroon | Red-tan to red-cream on edge. |
|   P | Light red-tan | Red-tan. |
| Tubed media | | |
| Gelatin | | |
|   Plain | | |
|     S | Colorless surface growth | Gray aerial growth. |
|     P | None | Red pigment in top 1/3; diffused in bottom 2/3. |
|     O | Liquefaction complete in four tubes; partial in two. | Liquefaction 1/3. |
|   Nutrient | | |
|     S | Colorless surface growth | Colorless surface growth. |
|     P | None to pale tan | None. |
|     O | Liquefaction complete | Liquefaction 1/3 in four tubes; complete in two. |
| Litmus milk | | |
|   S | Heavy surface pellicle with blue tinge and trace gray aerial growth. | Heavy surface pellicle with blue tinge and trace gray aerial growth. |
|   O | Partial peptonization; Partial decolorization; Partial coagulation; pH 6.9. | Partial peptonization; Complete decolorization; pH 7.2. |
| Nitrate broth | | |
|   Synthetic | | |
|     S | Pelleted colorless surface ring | Pelleted colorless surface ring. |
|     P | None | None. |
|     O | Growth throughout broth; Flocculent growth at base; Nitrate not reduced to nitrite. | Growth throughout broth; Flocculent growth at base; Nitrate not reduced to nitrite. |
|   Nutrient | | |
|     S | Heavy colorless surface ring with trace white aerial growth. | Good surface growth with trace white aerial growth. |
|     P | None | None. |
|     O | Heavy flocculent growth at base; Nitrate not reduced to nitrite. | Heavy flocculent growth at base; Nitrate not reduced to nitrite. |
| Peptone-yeast extract-iron agar (ISP-6) | | |
|   S | No aerial growth | Trace white aerial growth. |
|   R | Colorless to yellow-tan | Yellow-tan. |
|   P | None to pale yellow-tan | Yellow-tan. |
|   O | Melanin-negative | Melanin-negative. |
| Tyrosine agar (ISP-7): | | |
|   S | No aerial growth | Good gray aerial growth. |
|   R | Colorless to trace red | Gray. |
|   P | None | None. |
|   O | Melanin-negative | Melanin-negative. |

[1] In petridishes.

NOTE.—S = Surface; R = Reverse; P = Pigment; O = Other characteristics.

TABLE IV

Utilization of carbon compounds in the synthetic medium of Pridham and Gottlieb [1]

| | *S. pseudogriseolus* chemovar linmyceticus | *S. pseudogriseolus* ATCC 12770 |
|---|---|---|
| Control | (−) | (+) |
| D-xylose | + | + |
| L-arabinose | + | + |
| Rhamnose | + | + |
| D-fructose | + | + |
| D-galactose | + | + |
| D-glucose | + | (+) |
| D-mannose | + | + |
| Maltose | + | + |
| Sucrose | + | (+) |
| Lactose | + | + |
| Cellobiose | (−) | |
| Raffinose | + | (+) |
| Dextrin | + | + |
| Inulin | (−) | (+) |
| Soluble starch | + | + |
| Glycerol | (+) | + |
| Dulcitol | (−) | (+) |
| D-mannitol | + | + |
| D-sorbitol | (+) | (+) |
| Inositol | + | + |
| Salicin | (+) | (+) |
| Phenol | − | − |
| Cresol | − | − |
| Na formate | − | − |
| Na oxalate | (+) | (+) |
| Na tartrate | (−) | (+) |
| Na salicylate | − | − |
| Na acetate | (+) | + |
| Na citrate | (+) | + |
| Na succinate | (+) | + |

[1] Pridham, T. G., and D. Gottlieb. 1948. The utilization of carbon compounds by some Actinomycetales as an aid for species determination. J. Bacteriol. 56:107–114.

NOTE.— + = Positive utilization; − = Negative utilization; (−) = Slight growth, no utilization; (+) = Positive utilization, slight growth.

TABLE V

Utilization of carbon compounds in the modified medium of Pridham and Gottlieb [1]

|  | S. pseudogriseolus chemovar linmyceticus | S. pseudogriseolus ATCC 12770 |
|---|---|---|
| Negative control (basal agar) | (2) | (2) |
| Positive control (basal agar plus D-glucose) | (3) | (3) |
| L-arabinose | ++ | ++ |
| D-xylose | ++ | ++ |
| Inositol | ++ | ++ |
| D-mannitol | ++ | ++ |
| D-fructose | ++ | ++ |
| Rhamnose | ++ | ++ |
| Sucrose | − | − |
| Raffinose | − | − |
| Cellulose | − | − |

[1] Shirling, E. B., and D. Gottlieb. 1966. Methods for characterization of Streptomyces species. Int. J. Syst. Bacteriol. 16:313-340.
[2] No growth.
[3] Good growth.

NOTE.—++=Strong utilization—Growth on tested carbon in basal medium is equal to or greater than growth on basal medium plus glucose; −=Utilization negative—Growth is similar to or less than on basal medium without carbon.

Lincomycin is produced by the novel microorganism of the subject invention when said microorganism is grown in an aqueous nutrient medium under submerged aerobic conditions. It is to be understood also that for the preparation of limited amounts surface cultures and bottles can be employed. The organism is grown in a nutrient medium containing a carbon source, for example, an assimilable carbohydrate, and a nitrogen source, for example, an assimilable nitrogen compound or proteinaceous material. Preferred carbon sources include glucose, brown sugar, sucrose, glycerol, starch, cornstarch, lactose, dextrin, molasses, and the like. Preferred nitrogen sources include corn steep liquor, yeast, autolyzed brewer's yeast with milk solids, soybean meal, cottonseed meal, cornmeal, milk solids, pancreatic digest of casein, distillers' solids, animal peptone liquors, meat and bone scraps, and the like. Combinations of these carbon and nitrogen sources can be used advantageously. Trace metals, for example, zinc, magnesium, manganese, cobalt, iron, and the like, usually need not be added to the fermentation media since tap water and unpurified ingredients are used as media components.

Production of lincomycin by the process of the invention can be effected at any temperature conducive to satisfactory growth of the novel microorganism, for example, between about 18° and 40° C., and preferably between about 20° and 32° C. Ordinarily, optimum production of lincomycin is obtained in about 2 to 10 days. The medium normally remains basic during the fermentation. The final pH is dependent, in part, on the buffers present, if any, and in part on the initial pH of the culture medium.

When growth is carried out in large vessels and tanks, it is preferable to use the vegetative form, rather than the spore form, of the microorganism for inoculation to avid a pronounced lag in the production of lincomycin and the attendant inefficient utilization of the equipment. Accordingly, it is desirable to produce a vegetative inoculum in a nutrient broth culture by inoculating this broth culture with an aliquot from a soil or a slant culture. When a young, active vegetative inoculum has thus been secured, it is transferred aseptically to large vessels or tanks. The medium in which the vegetaive inoculum is produced can be the same as, or different from, that utilized for the production of lincomycin, as long as it is such that a good growth of the microorganism is obtained.

The microorganism of the subject invention can also be grown in the media and under the conditions disclosed in U.S. Pat. 3,086,912. Further, the lincomycin compound produced by the subject process can be recovered by the procedures disclosed in U.S. 3,086,912.

In a preferred recovery process, lincomycin is recovered from its culture medium by separation of the mycelia and undissolved solids by conventional means, such as by filtration and centrifugation. Lincomycin is then recovered from the filtered or centrifuged broth by extraction with a water-immiscible organic solvent in which lincomycin is soluble, for example, 1-butanol, methyl ethyl ketone, benzene, and methylene chloride (preferred). Advantageously, the extraction is carried on after the filtered fermentation beer is adjusted to a pH of about 8.5 to 10.0 with a base, for example, sodium hydroxide. The solvent extract containing lincomycin can be concentrated to an oily material, which can then be subjected to extraction with ether and acidic methanol to give a colorless amorphous preparation of the acid salt of lincomycin.

It is to be understood that the process of the subject invention, though described in detail with particular reference to the novel microorganism *Streptomyces pseudogriseolus* chemovar *linmyceticus* Dietz var. nova, NRRL 3985, is not limited to this particular microorganism or to microorganisms fully described by the cultural characteristics disclosed herein. It is intended that this invention also include other strains or mutants of the said microorganism which can be produced by procedures well known in the art, for example, by subjecting the novel microorganism to X-ray or ultraviolet radiation, nitrogen mustard, phage exposure, and the like.

Hereinafter are described non-limiting examples of the process of the present invention. All percentages are by weight and all solvent mixture portions are by volume unless otherwise noted.

EXAMPLE 1

(A) Fermentation

A soil slant of *Streptomyces pseudogriseolus* chemovar *linmyceticus* Dietz var. nova, NRRL 3985, is used to inoculate a series of 500-ml. Erlenmeyer flasks each containing 100 ml. of seed medium consisting of the following ingredients:

|  | G./l. |
|---|---|
| Glucose monohydrate | 25 |
| Pharmamedia* | 25 |
| Tap water, q.s. | Balance |

*Pharmamedia is an industrial grade of cottonseed flour produced by Traders Oil Mill Company, Fort Worth, Tex.

The flasks are grown for 3 days at 28° C., on a rotary shaker.

Five percent of the seed inoculum, described above, is used to inoculate a 500-ml. Erlenmeyer fermentation flask containing 100-ml. of sterile medium consisting of the following ingredients:

|  | G./l. |
|---|---|
| Lactose | 10 |
| Phytone* | 10 |
| NaCl | 5 |
| NaNO$_3$ | 1 |
| CaCO$_3$ | 10 |
| Tap water, q.s. | Balance |

*A plant peptone supplied by B.B.L., Division of Bio-Quest, Cockeysville, Md.

A series of 500-ml. flasks, as described above, are used to provide additional fermentation material. These flasks are sterilized, prior to inoculation, for 30 minutes at 130° C. The inoculated fermentation flasks are incubated at 28° C. on a rotary shaker (250 r.p.m., 6 cm. stroke) for 2 days.

A typical fermentation flask has the following antibacterial spectrum as determined by a standard microbiological disc plate assay.

| Organism: | Zone (mm.), 48 hours |
|---|---|
| B. subtilis | 17 |
| S. aureus | 27 |
| S. lutea | 36 |
| K. pneumoniae | 0 |
| E. coli | 0 |
| S. schottmuelleri | 0 |
| P. vulgaris | 0 |
| M. avium | Trace |

(B) Extraction

Whole fermentation broth is filtered using diatomaceous earth as a filter aid. The filter cake is washed with 2 l. of water and the wash is combined with the clear filtrate (approximately 9 l., pH 8.8). The clear filtered wash is then mixed with potassium carbonate (200 g./l.). The pH is approximately 11.8. The alkaline solution is then extracted three times with 3 l. of methylene chloride each time. The methylene chloride extracts are combined and this solution is concentrated to dryness. The resulting residue is then dissolved in 500 ml. of ether. Methanolic hydrogen chloride (1 N, 5 ml.) is added to the ether solution to precipitate lincomycin hydrochloride which is then isolated by filtration and dried; yield, 200 mg. This preparation is characterized by thin layer chromatography using silica gel G (Merck A.G., Darmstadt) as a support and methyl ethyl ketone-acetone-water (186:52:20 v./v.) as the solvent. The preparation is also characterized by using infrared and nuclear magnetic resonance spectroscopy. All of these characterization tests identify lincomycin, a well known antibiotic, in the preparation.

What is claimed is:

1. A novel process for preparing the antibiotic lincomycin which comprises cultivating *Streptomyces pseudogriseolus* chemovar *linmyceticus* Dietz var. nova, having the identifying characteristics of NRRL 3985, and lincomycin producing mutants thereof, in an aqueous nutrient medium under aerobic conditions until substantial antibiotic activity is imparted to said medium by the production of lincomycin.

2. A process, according to claim 1, wherein said aqueous nutrient medium contains a source of assimilable carbohydrate and assimilable nitrogen.

3. A process, according to claim 1, wherein said lincomycin is isolated from the fermentation broth.

References Cited

UNITED STATES PATENTS 3,086,912   4/1963   Bergy et al. _____ 195—80 X

A. LOUIS MONACELL, Primary Examiner

R. J. WARDEN, Assistant Examiner